United States Patent [19]

Kopich

[11] Patent Number: 4,569,572
[45] Date of Patent: Feb. 11, 1986

[54] HOOD FOR VIDEO TERMINALS

[76] Inventor: Leonard F. Kopich, 28326 Brush, Madison Heights, Mich. 48071

[21] Appl. No.: 580,090

[22] Filed: Feb. 14, 1984

[51] Int. Cl.$^4$ .................. G02B 27/00; G06C 29/00
[52] U.S. Cl. .................. 350/276 R; 358/229; 358/252; 358/255
[58] Field of Search .................. 350/276 R; 358/229, 358/245, 252, 255

[56] References Cited

U.S. PATENT DOCUMENTS

| | | | |
|---|---|---|---|
| 3,001,015 | 9/1961 | Weiss .................. | 358/252 |
| 3,961,159 | 6/1976 | Hursey .................. | 350/276 R |
| 4,032,222 | 6/1977 | Lapeyre .................. | 350/276 R |
| 4,314,280 | 2/1982 | Rose .................. | 358/255 |
| 4,444,465 | 4/1984 | Giulie et al. .................. | 350/276 R |

Primary Examiner—John K. Corbin
Assistant Examiner—Loha Ben
Attorney, Agent, or Firm—Basile, Weintraub & Hanlon

[57] ABSTRACT

A hood releasably attachable to the front end of a video terminal is disclosed as having right angle flanges associated with the rear end of the hood which slidably engage and releasably secure the hood to the video terminal. In one embodiment the hood is fixedly secured to the video terminal, and in a second embodiment the hood is provided with means for adjusting its angular position with respect to the hood to accommodate for different lighting conditions and for users of different heights. The hood employs an elastic member for securing the lower portion of the hood to the video terminal.

8 Claims, 14 Drawing Figures

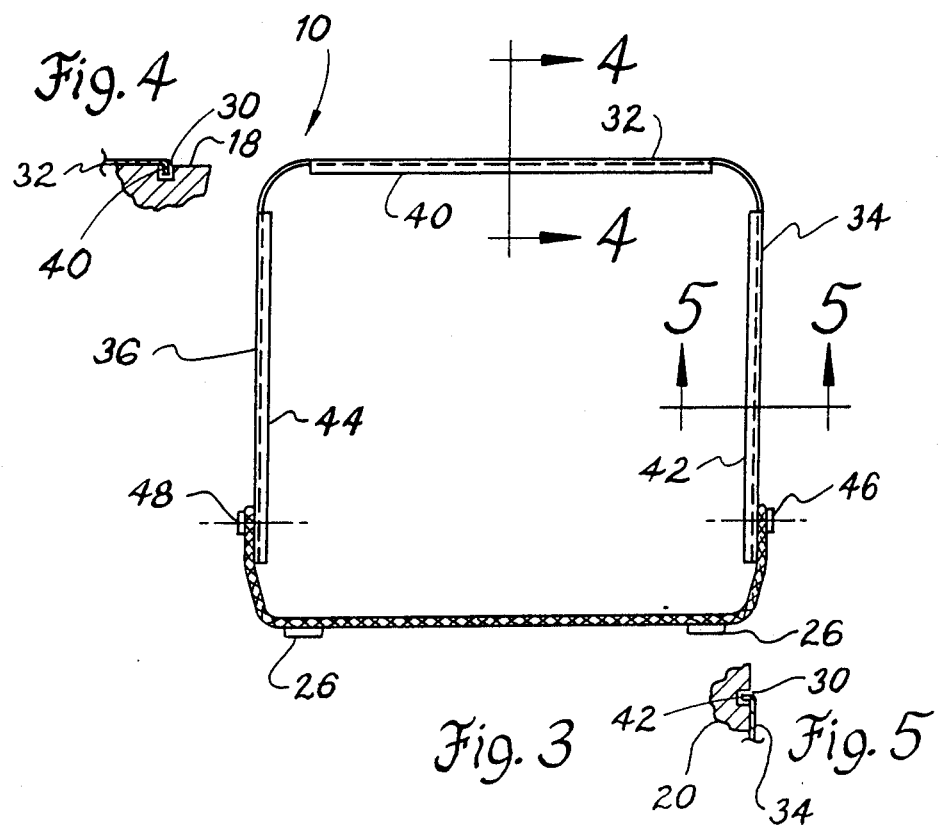
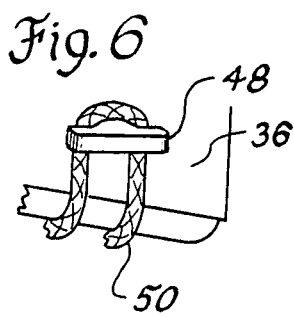
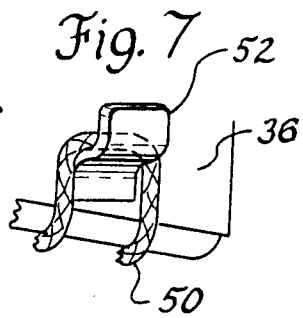
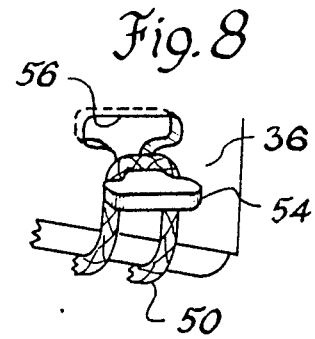
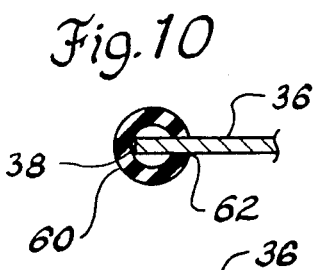
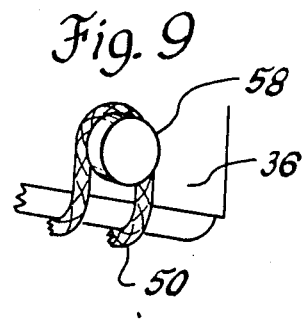
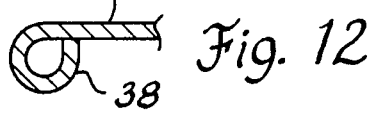

HOOD FOR VIDEO TERMINALS

BACKGROUND OF THE INVENTION

I. Field of the Invention

The present invention relates to glare reducing devices and, in particular, the present invention relates to a hood adapted to be attached to a video terminal to substantially reduce the glare associated with a CRT screen.

II. Description of the Prior Art

The use of video terminals in the office environment in recent years has been substantially increased to the extent that it is a common occurrence for secretaries, data processor users and engineering designers to be working in front of a CRT screen of a video terminal. It is also a common occurrence that such video terminals are used in conventional offices that are not provided with any type of reduced lighting, as the other activities of the office must continue and normally require a substantial amount of light. This results in a considerable amount of CRT-reflective light, especially in the office environment where high intensity light is provided to ensure good viewing. This glare can cause eye tension and headaches leading to stress which can be a subtle but powerful factor in decreased productivity and job dissatisfaction. It is known to the Inventor that others have employed glare screens completely overlying and covering the CRT screen so as to reduce CRT reflected light and the bad effects associated therewith. Such screens generally must be attached to the CRT screens by an adhesive and require a coating of some type of filtering material, such as an anti-reflection permanent coating that tends to eliminate much of the incoming light before it can be reflected back to the user. The difficulty with such filters is that they also have a tendency to filter out the material appearing on the CRT screen, making it more difficult for the user to view the screen.

Because of the filtering medium that is inserted on the CRT screen between the viewer and the image, it is necessary that such CRT screens be turned on brighter so that the image may be easily viewed, which has a tendency to decrease the life of the CRT screen. It has also been noted by the Inventor that such filter screens are expensive and generally require special installation features, such as an adhesive or tape, and may have to be recoated from time to time with some type of anti-reflection material.

It would therefore be desirable to provide a simple means for improving the contrast and sharpness of the CRT screen image by the elimination of glare.

SUMMARY OF THE INVENTION

The present invention, which will be described subsequently in greater detail, comprises a hood adapted to overlie the CRT screen of a video terminal and which is attachable to the screen without the need for special adhesives or tapes or modification to the CRT terminal.

It is an object of the present invention to provide such a hood which minimizes stress associated with glare by reducing the amount of glare associated with the CRT screen, yet one which does not require an increase in the brightness of the CRT screen. By reducing the glare, the brightness of the CRT screen may be reduced, thus tending to increase the life of the CRT screen tube.

It is therefore a primary object of the present invention to provide a hood for video terminals which is adapted to overlie the CRT screen to minimize glare.

It is a further object of the present invention to provide a hood of the type described herein which can be attached to a conventional video terminal without the need for modifying the terminal or the need for providing special securing means, such as adhesives or tapes.

It is another object of the present invention to provide a hood of the type described herein which will function to minimize eyestrain, increase the life of the CRT screen and yet one which is simple in construction and, thus, relatively inexpensive to manufacture.

Other objects, advantages and applications of the present invention will become apparent to those skilled in the art of filtering flare in video terminals when the accompanying description of several examples of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 3 is a cross-sectional view of the rear portion of the hood as seen along line 3—3 of FIG. 2 with the internal portions of the video terminal eliminated for clarity;

FIG. 4 is a fragmentary, cross-sectional view taken along line 4—4 of FIG. 3 showing the engagement of the hood top with the video terminal;

FIG. 5 is a fragmentary, cross-sectional view taken along line 5—5 of FIG. 3 showing the engagement of the side wall of the hood with the adjacent side surface of the video terminal;

FIG. 6 is an enlarged, fragmentary, perspective view of the anchor cleat illustrated in FIG. 1;

FIG. 7 is a fragmentary, perspective view of an alternate modification of the anchor cleat;

FIG. 8 is a fragmentary, perspective view of yet another modification of the anchor cleat;

FIG. 9 is a fragmentary, perspective view of yet a fourth modification of the anchor cleat;

FIG. 10 is a fragmentary, cross-sectional view taken along line 10—10 of FIG. 2 illustrating one example of a protective guard for the forward edge of the inventive hood;

FIG. 11 is a fragmentary, cross-sectional view similar to FIG. 10 showing a modification of the protective guard that may be used with the inventive hood;

FIG. 12 is a fragmentary, cross-sectional view similar to FIG. 10 showing a third modification where the hood edge defines a protective guard;

DETAILED DESCRIPTION OF THE PREFERRED EMBODIMENTS

Figure 1:
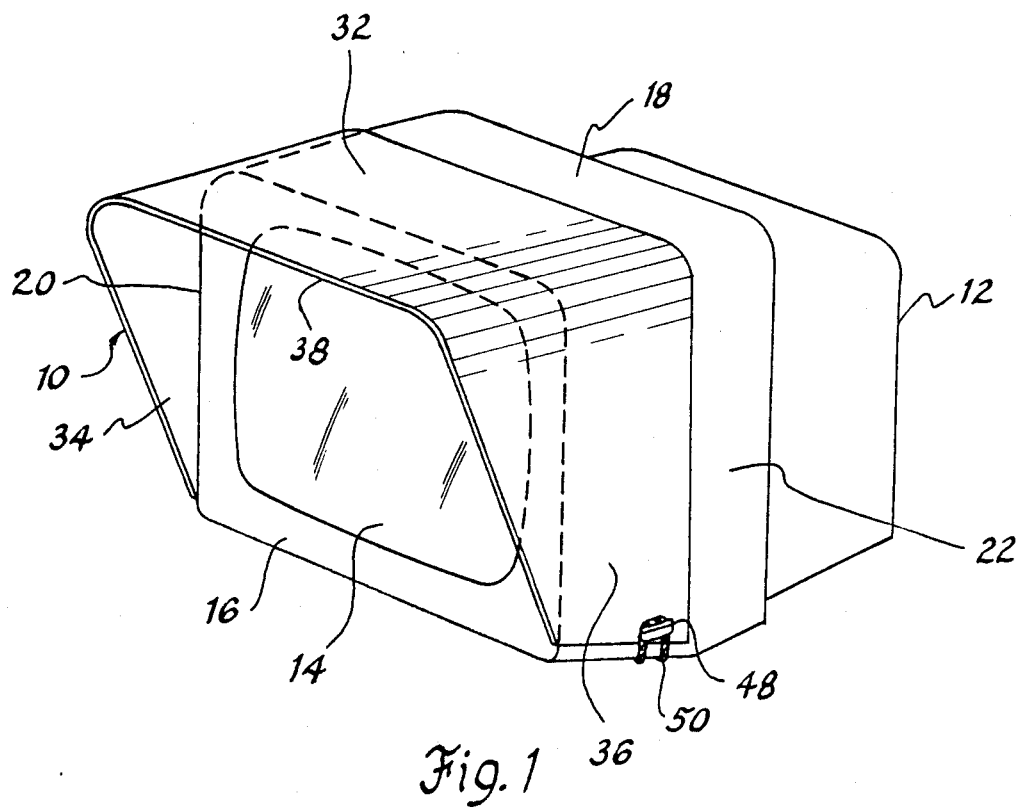
FIG. 1 is a perspective view of one example of the present invention in the form of a hood attached to the front end of a video terminal having a CRT screen.
Figure 2:
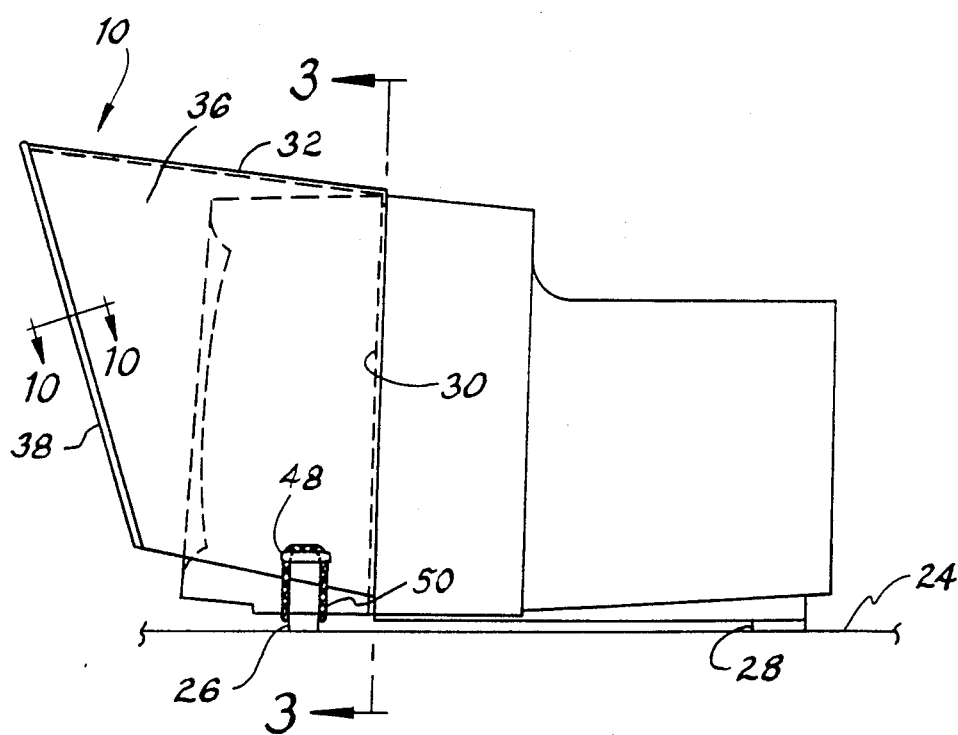
FIG. 2 is a right side elevational view of the hood and video terminal illustrated in FIG. 1.

Referring now to the drawings and, in particular, to FIGS. 1, 2 and 3 wherein there is illustrated one example of the present invention in the form of a hood 10 adapted to be releasably attached to the front end 16 of a video terminal 12 of the type having a CRT screen 14. The video terminal 12 includes a top surface 18 and opposite side surfaces 20 and 22. The video terminal 12 is supported in a viewable position on a desk or other work table 24 by means of a plurality of foot pads 26 and 28 (see FIG. 2). As can best be seen in FIGS. 2 and 3, the top surface 18 and the side surfaces 20 and 22 of the video terminal 12 are provided with a continuous peripheral groove 30, the purpose of which will be described hereinafter in greater detail. The groove 30 is conventional on many video terminals.

The hood 10 is generally U-shaped in configuration having a top wall 32 with integral, downwardly depending, opposing side walls 34 and 36. The top wall 32 of the hood is wider than the bottom edge of the side walls 34 and 36 such that the forward edge 38 of the hood 10 extends downwardly at an incline, as viewed in FIG. 2 of the drawings.

As can best be seen in FIGS. 3, 4 and 5 of the drawings, the top wall 32 and side walls 34 and 36 of the hood 10 are provided with bent edges which, respectively, define right angle flanges 40, 42 and 44. When the hood 10 is in the position illustrated in FIGS. 1 and 2, the flanges 40, 42 and 44 engage the peripheral groove 30 located along the video terminal surfaces 18, 20 and 22 to securely attach the hood 10 to the video terminal 12. Normally the hood 10 is positioned above the video terminal 12 with the flanges 42 and 44 aligned with the peripheral groove 30 in the terminal side surfaces 20 and 22. The hood 10 is then lowered with the flanges 42 and 44 slidably engaging the peripheral groove 30. As the hood 10 is lowered into its final position, the top surface flange 40 of the hood 10 engages the groove 30 disposed along the upper surface 18 of the video terminal 12.

To ensure a tight, snug fit and to minimize the possibility of light entering between the adjacent surfaces of the hood 10 and the video terminal 12, the side walls 34 and 36 of the hood 10 are provided with anchoring cleats 46 and 48. As can best be seen in FIG. 6, the anchoring cleat 48 is illustrated as having a T-shaped configuration which is adapted to receive an elastic cord 50. As can best be seen in FIG. 2, elastic cord 50 extends on either side of the support pad 26 to the opposite side of the terminal wherein it engages the anchor cleat 46 disposed on side wall 34 of the hood 10.

FIG. 7 illustrates a variation in the anchor cleat in the form of anchor cleat 52 which has an S-shaped configuration wherein one leg of the S is spot welded to the side wall 36 and the cord 50 overlies the other leg.

FIG. 8 discloses yet another embodiment of an anchor cleat in the form of a punched-out, T-shaped tab 54. The punched-out tab 54 leaves a complementary shaped aperture 56 formed in the side wall 36 of the hood 10 and the cord 50 engages the anchor cleat 54 in the same manner as described hereinbefore with respect to the anchor cleat 48.

FIG. 9 illustrates yet another embodiment of an anchor cleat in the form of a circular knob 58 which is spot welded to the side wall 36 and functions in the same manner as described hereinbefore with respect to the aforementioned anchor cleats in that the cord 50 engages the anchor cleat 58 so as to secure the hood 10 to the video terminal 12.

The leading edge 38 of the screen is preferably provided with a means for protecting the user against possible injury due to accidently abutting the hood 10 during use. FIG. 10 illustrates one example of a protective guard in the form of a tubular rubber member 60 which has a lengthwise slit 62 that permits the positioning of the tubular rubber member 60 over the entire leading edge 38.

FIG. 11 illustrates a protective member 64 having a U-shaped cross section with a serrated interior surface 66 which snugly and tightly engages the opposing surfaces that define the leading edge 38 to provide a protective barrier.

FIG. 12 illustrates a protective guard wherein the edge 38 has been formed by curling the leading edge 38 of the hood 10 in the manner illustrated to provide protection for the user.

In the preferred embodiment the hood 10 is fabricated from any of a plurality of usable materials, such as aluminum or steel or plastic materials, that may either be opaque or translucent to filter glare with the inside surfaces of the hood typically being painted a flat black.

Referring to FIG. 3, the upper left- and right-hand corners of the hood 10 are preferably constructed so as to bow inwardly, providing a spring action biasing the flanges 42 and 44 into the groove 30 of the associated side surfaces 20 and 22 of the video terminal 12.

It should also be noted that the flange 40 associated with the top wall 32 of the hood 10 may extend around and be integral with the flanges 42 and 44.

Figure 13:
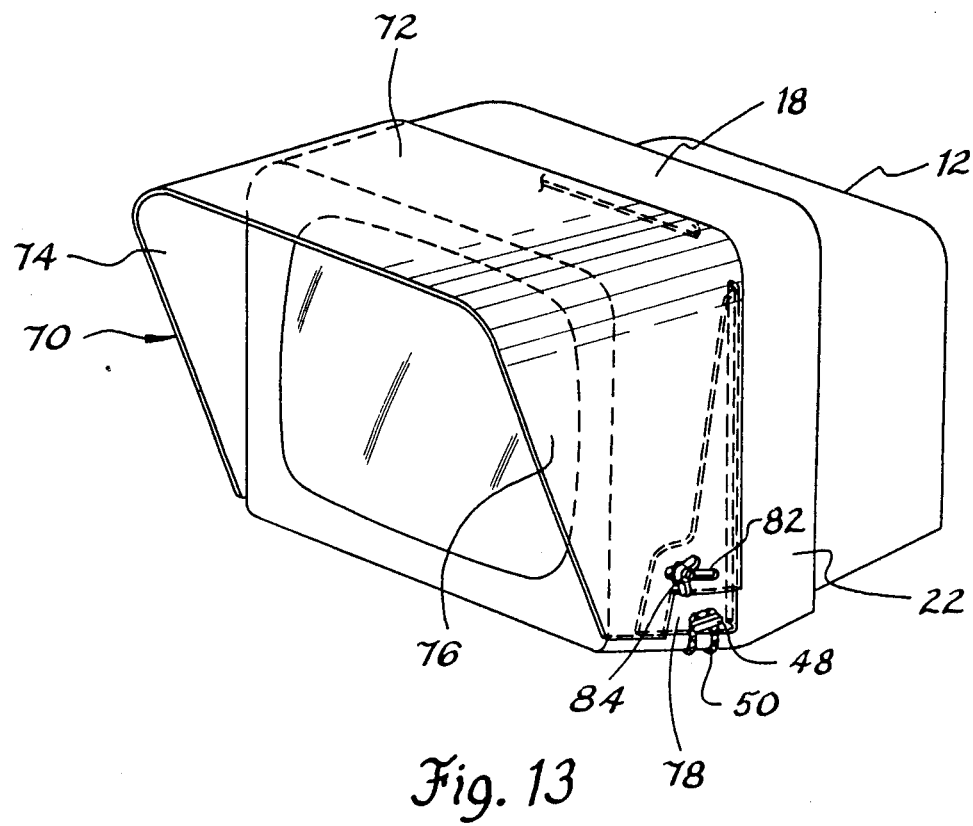
FIG. 13 is a perspective view of a second embodiment of the present invention in the form of an adjustable hood attached to a video terminal.
Figure 14:
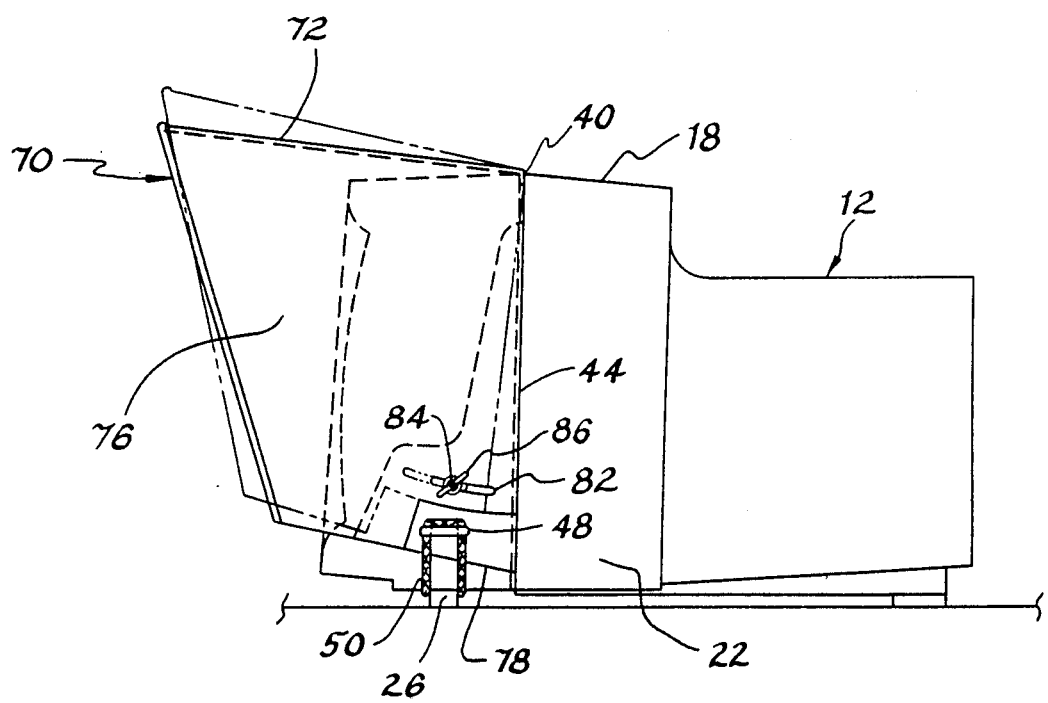
FIG. 14 is a side elevational view of the hood illustrated in FIG. 13 with a second position of the hood being shown in phantom lines.

Referring now to FIGS. 13 and 14 for a description of a second embodiment of the present invention in the form of an adjustable hood 70 adapted to be attached to the video terminal 12. The hood 70 is similar to the aforementioned hood 10 in that it has a top wall 72 and opposing side walls 74 and 76. The top wall 72 is provided with a bent end defining the right angle flange 40 and is adapted to pivotally engage the peripheral groove 30 formed in the surface 18 of the video terminal 12. Unlike the hood 10, the side walls 74 and 76 of the hood 70 do not have right angle flanges formed thereon. Alternately, the right angle flanges 42 and 44 (only which is shown in FIG. 13) are formed on a pair of support members 78. Support members 78 are generally triangular in shape. Each hood side wall 74 and 76 is provided with an arcuate slot 82 through which a threaded member 84 extends. Threaded member 84 is fixedly secured to a lower intermediate portion of the support member 78 and threadingly engages a wing nut 86. As can best be seen in FIG. 14, each support member 78 is provided with the anchor cleat 48 which is engaged by the cord 50 so as to securely attach the hood 70 to the video terminal 12.

It can thus be seen that the hood 70 is attached to the video terminal 12 by positioning the hood 70 above the terminal 12 and lowering the hood 70 so that the flanges 42 and 44 associated with the support member 78 slidably engage the groove 30 associated with the opposite side surfaces 20 and 22 of the video terminal 12 and the flange 40 associated with the hood top wall 72 of the terminal engages the grooves 30 in the upper wall 18 of the video terminal 12. It can also be seen that when the wing nut 86 is loosened, the hood 70 may pivot about the groove 30 where the flange 40 is located and the hood 70 is tilted between the positions illustrated in FIG. 14. The hood 70 is thus adjustable to accommodate different lighting conditions and eliminate the glare that would occur on the surface of the CRT screen. The hood 70 also provides a simple means of adjustment to accommodate various sized users of the video terminal 12. When the operator positions the hood in its desired position, wing nut 86 is tightened to secure the hood 70 at the proper angular position.

It can thus be seen that the Inventor has disclosed a hood which does not require any modification to the video terminal in order for the hood to be secured thereto. It also can be seen that the Inventor's hood can be easily mounted to the video terminal without the need for special tools, adhesives, tapes or the like. It should also be noted that the elastic cord 50 is trapped between the pads of the video terminal such that if it should slip out of the hands of the user while the hood is being installed upon the video terminal, the "slingshot" effect that could occur is eliminated by the engagement of the cord 50 with the video terminal pads 26.

It should also be noted that the Inventor has provided a simple and unique hood which does not interfere with the servicing of the video terminal, provides a simple means for eliminating glare of the video screen, tends to lengthen the life of the CRT tube as it does not need to be turned on as bright as is necessary with the prior art glare screens, and thus simplifies the operator's use of the video terminal while eliminating the aforementioned stress associated with glare.

It should be understood by those skilled in the art of glare prevention for video terminals that other forms of the Inventor's invention may be had, all coming within the spirit of the invention and scope of the appended claims.

What I claim is:

1. A hood for a video terminal of the type having a viewable CRT screen positioned between opposing side surfaces and below a top surface, each of the surfaces being formed with grooved sections, said hood comprising:

a top wall having depending opposing side walls, said top wall being adapted to overlie a portion of the top surface of said terminal and said side walls overlying a portion of said side surfaces of said terminal such that the hood projects outwardly away from said CRT screen when carried by said terminal, said hood walls having projecting flanges alignable with and received by said grooved sections of said terminal for securing said hood to said terminal; and wherein the lower portion of each of said hood side walls is provided with an anchor cleat and an elastic cord adapted to be received and secured to each cleat, said cord extending under said terminal when said hood is carried by said terminal so as to secure said hood thereto.

2. The hood defined in claim 1 wherein the groove defined on said terminal is a continuous peripheral groove, said hood top wall and said hood side walls each having inwardly bent ends defining right angle flanges which are received in said terminal grooved sections.

3. The hood defined in claim 1 wherein said anchor cleat has a T-shaped configuration.

4. The hood defined in claim 1 wherein said anchor cleat has an S-shaped configuration.

5. The hood defined in claim 1 wherein said anchor cleat comprises a circular knob.

6. The hood defined in claim 1 wherein the side wall of said hood has a punched-out section bent at a right angle with respect to said side wall and defining a section which is engaged by said elastic member.

7. A hood for a video terminal of the type having a viewable CRT screen positioned between opposing side surfaces and below a top surface, each of the surfaces being formed with grooved sections, said hood comprising:

a top wall having depending opposing side walls, said top wall being adapted to overlie a portion of the top surface of said terminal and said side walls overlying a portion of said side surfaces of said terminal such that the hood projects outwardly away from said CRT screen when carried by said terminal, said hood walls having projecting flanges alignable with and received by said grooved sections of said terminal for securing said hood in said terminal;

each of said side walls including a support member, each of said support members being provided with a right angle flanged section engaging said grooved section of the associated side walls of said video terminal:

an anchor cleat carried by the lower portions of each of said support members; and a flexible member extending under said video terminal and securing said anchor cleats to bring said side walls of said hood in snug engagement with the adjacent sides of said video terminal, said hood being pivotable about the grooved section of said top surface such that said flange of said hood pivots within its associated grooved section to permit adjustment of said hood with respect to said video terminal; and means for releasably securing said support members to the associated side walls of said hood.

8. The hood defined in claim 7 wherein each of said side walls of said hood overlie its associated support member and said side walls are provided with an arcuate slot, said releasable securing means comprising a fixed member carried by its associated support member and extending through said arcuate slot and threadingly engaging a fastening member adapted to lockingly engage said hood at selectable positions along said arcuate slot.

* * * * *